United States Patent [19]

Suda

[11] Patent Number: 4,904,326

[45] Date of Patent: Feb. 27, 1990

[54] PROCESS OF MAKING A HOLLOW STRUCTURE OF CARBON MATERIAL

[75] Inventor: Yoshihisa Suda, Maebashi, Japan

[73] Assignee: Mitsubishi Pencil Co., Ltd., Tokyo, Japan

[21] Appl. No.: 239,270

[22] Filed: Sep. 1, 1988

[51] Int. Cl.[4] ...................... B29C 65/54; C01B 31/02
[52] U.S. Cl. .............................. 156/242; 156/244.13; 156/244.24; 156/244.26; 156/304.2; 156/335; 264/29.6; 264/29.7; 264/209.1; 264/211.2; 264/250; 264/309; 264/328.2; 423/449
[58] Field of Search ................... 264/29.1, 29.5, 29.6, 264/29.7, 134, 250, 209.1, 211.2, 309, 328.2, 349; 423/449; 427/227; 156/242, 244.13, 244.24, 244.26, 304.2, 335

[56] References Cited

U.S. PATENT DOCUMENTS 4,221,773 9/1980 Tsukagoshi et al. ........... 423/449 X

FOREIGN PATENT DOCUMENTS

| 39-25287 | 11/1964 | Japan | 264/29.1 |
| 58-201496 | 11/1983 | Japan | 264/250 |
| 60-121895 | 6/1985 | Japan | 423/449 |
| 60-155570 | 8/1985 | Japan | 264/29.1 |

Primary Examiner—Jeffery Thurlow
Assistant Examiner—Leo B. Tentoni
Attorney, Agent, or Firm—Oliff & Berridge

[57] ABSTRACT

A process for producing hollow structures of carbon material having desired shape and properties of carbon by obtaining a carbon paste composition, molding portions of the hollow structure by a method selected from the group consisting of an injection molding method, an extrusion molding method, a casting method or a fluidizing method, bonding the molded portions together using a paste composition, solidifying the bonded portion by precarbonizing, the hollow structures thus provided, and then calcining in an inert gas atmosphere as required. Hollow structures of carbon materials having a rigid bond, excellent impermeability, and complicated shape can be readily accurately and inexpensively produced without working after calcining.

8 Claims, 1 Drawing Sheet

PROCESS OF MAKING A HOLLOW STRUCTURE OF CARBON MATERIAL

BACKGROUND OF THE INVENTION

The present invention relates to a process for producing a hollow structure of carbon material and, more particularly, to a process permitting, without working after calcining, manufacture of a hollow structure having a desired shape and properties of carbon materials.

Heretofore, hollow structures of carbon materials have been produced by secondary working, such as by cutting a largesized block-shaped carbon material, and have been limited in their shape. Thus, only simple shapes, such as pipes, have been produced. In addition, waste materials, such as cutting chips, have been produced. Since the strength of carbon base materials is low, sheets cannot be produced, and impermeable carbon materials cannot be obtained. Because it is difficult to cut vitreous carbon materials having excellent impermeability to an arbitrary shape, hollow structures of such carbon materials are typically not provided by cutting. Although hollow structures of carbon materials can be manufactured by bonding calcined and worked products cut from a block to each other with a carbon cement made of graphite powder, resin and pitch and then recalcining the product, a high bonding strength cannot be provided due to ultrafine cracks, which occur due to calcining and contracting of the carbon cement. Moreover, the cost increases due to the necessity of the cutting step and the two calcining steps.

SUMMARY OF THE INVENTION

Accordingly, an object of the present invention is to provide an improved inexpensive process for producing a hollow structure of carbon materials having a rigid bond, excellent impermeability, and a complicated shape which does not require working after calcining.

To achieve the foregoing object of the present invention, the inventor has undertaken a study to develop hollow structures of carbon materials having a desired shape and properties by obtaining a paste composition, molding the paste composition into portions of the desired hollow structure by an injection molding method, an extrusion molding method, a casting method or a fluidizing method, bonding the molded portions to the desired shape with a bonding paste composition, solidifying the bonded portions by precarbonizing to produce a hollow structure, and then calcining the hollow structure in an inert gas atmosphere as required.

A process for producing a hollow structure of carbon material according to the present invention will be described in detail.

Green materials or precarbonized materials are first provided. A monomer of a precondensated polymer of a thermosetting resin and a carbon powder are uniformly mixed by a mixer, such as a Henschel mixer, and the mixture is then kneaded by a kneader capable of applying high shearing force, such as a pressure kneader, two rollers or three rollers, or rotary ball mills to produce a molding paste composition in which carbon powder is uniformly dispersed therein. In this case, to adjust viscosity, a plasticizer or a solvent is added, as required.

The molding paste composition is then molded into at least two portions or components of the desired hollow article. Thus, the molding paste composition is molded into recessed, cup-shaped, pipelike, platelike or slot-shaped moldings by an injection molding method, an extrusion molding method, a casting method or a fluidizing method to produce a molded green component. The molded components are then insolubilized and infusibilized by heating or oxidizing to produce precarbonized components.

Then, the green or precarbonized portions or components are bonded and molded into the desired shape by using a carbon paste composition as a bonding agent, thereby producing a bonded hollow structure.

The desired calcined hollow structure is produced by heating the bonded portion of the hollow structure material, removing solvent and solidifying the material. After adjusting the shape before calcining, the hollow structure is precarbonized as required, and gradually heated in an inert gas atmosphere for calcining. The calcining temperature is 800° C. or higher, and preferably 1000° to 1500° C. In order to provide preferable bonding of the bonded portion and to prevent the shape from deforming at the calcining time, the hollow structure is heated up to 600° C. at a temperature rising velocity of 3° to 100° C./hr. and preferably 50° to 30° C./hr., and from 600° C. at 100° C./hr.

Suitable thermosetting resins which may be employed in the present invention include furan resins, phenolic resins, xylene resins, polyimide resins, polyamide resins and bismaleimido resins. Among those resins which are advantageous in workability such as moldability, shape retentivity during calcining and economy are furan resins such as furfuryl alcohol/furfural cocondensates, furfural/phenols and furfural/ureas; phenolic resins such as resols and novolaks or their mixtures are also preferred.

Suitable binders for the molding paste compositions which may be used in the present invention include a variety of resins such as ordinary pitches and tars. Thermosetting resins are particularly useful because they possess a high degree of freedom of moldability and high green strength, and deformation can be prevented without complicated pretreatment.

Suitable carbon powders include natural graphite, artificial graphite, carbon black, and carbon fiber chips. Of them, one or more mixtures having a mean particle size of 100 microns or lower are preferable. If a powder having a mean particle size greater than 100 microns is used, the rough surface of the materials at the molding time is remarkable, thereby hardly providing accuracy. The amount of carbon powder to be added in the process of the present invention may be selected suitably up to 70 wt. %, and preferably 50 wt. % or less. If the mixing amount exceeds 70 wt. %, the fluidity of the composition is insufficient.

In order to produce a carbon material having properties as desired, it is necessary to increase the amount of graphite to increase the density and lubrication, to mix carbon black to adjust the electrical resistance and to reduce the anisotropy, to mix carbon fiber chip or graphite to increase the strength and to reduce electrical resistance, and to reduce the amount of carbon powder to enhance impermeability.

The composition of the bonding paste composition is similar to the composition of the moldings to be bonded. When calcining at 1000° C. the difference in composition of the moldings and the bonding agent should fall within 20% and preferably with 10% so as not to cause cracks at the bonded portion and to increase the bonding strength.

According to the present invention as described above, impermeable hollow structures of carbon material of complicated shape can be accurately and readily produced without the necessity of machining after calcining. Therefore, hollow structures of carbon materials having a desired shape and properties as required may be inexpensively manufactured for use in fields which require hollow structures of carbon materials, such as heat exchangers used in corrosive atmospheres, which requirements cannot be satisfied by the existing carbon materials.

BRIEF DESCRIPTION OF THE DRAWINGS

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
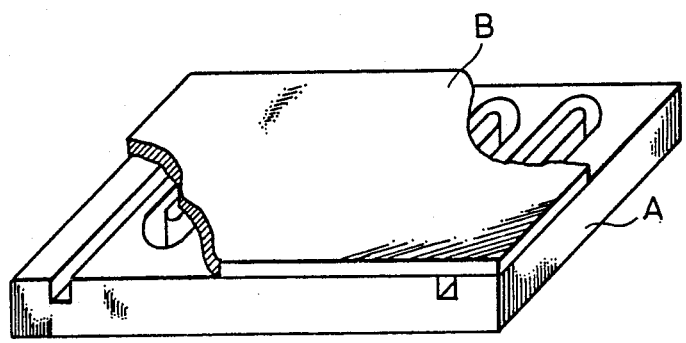
FIG. 1 is an explanatory view showing an embodiment of a hollow structure of carbon material according to the present invention.

An example of the present invention will be described, but the present invention is not limited to a particular example.

EXAMPLE

The following steps were performed to produce a hollow structure of carbon material (FIG. 1) made of impermeable carbon and having a complicated shape having zigzag slots penetrating from one end to the other therein.

In order to produce a grooved portion A, 80 wt. % of modified phenolic resin (FR16475 produced by Sumitomo Bakelite Co., Ltd., Japan) and 20 wt. % of natural flaky graphite (CM-100 produced by Nippon Graphite Co., Ltd., Japan having 1 micron of means particle size) were uniformly mixed in a Henschel mixer, and the mixture was kneaded by three rollers to produce a paste material. Then, 0.5 wt. % of a curing agent (HP-44 produced by Sumitomo Bakelite Co., Ltd., Japan) was added to the paste and the mixture was then molded in an injection molding machine to produce a grooved portion A, which was cured at 160° C. in an oven for 2 hours.

In order to produce an upper cover B, a second portion of the kneaded material used to mold grooved portion A was molded by an extrusion molding machine to produce a plate, which was cured at 160° C. in an oven for 2 hours. The portion A and the portion B were subsequently bonded using a paste composition produced by kneading 75 wt. % of phenol resin, 25 wt. % of graphite and 1.0 wt. % of a curing agent to produce a bonded hollow article. After bonding, the bonded hollow article was held at 100° C. in an oven for 1 hour, and solidified, thereby providing a hollow structure made from the portions A and B. This hollow structure was then heated and carbonized at a temperature rising velocity of 20° C./hr. up to 500° C. and at 50° C./hr. up to 1000° C. in a nitrogen atmosphere, thereby producing a calcined hollow product after cooling. The bonded state was preferable at this time. The air permeability of the hollow product is $9 \times 10^{-11}$ cm$^2$/sec., the electrical specific resistance is $2.9 \times 10^{-3}$ ohm cm, and the bending strength is $1.80 \times 10^4$ g/mm$^2$.

In order to observe the strength of the bonded surface of the material, a bonded test piece was produced under the same conditions as those described above, and the bending strength was measured. The bending strength of the bonded test piece was $1.75 \times 10^4$ g/mm$^2$, which is substantially the same as that of the impermeable sole material. In order to evaluate the bonded state of the bonded structure, a tube was connected to both ends, and air bubbles generated at the bonded portion under water were observed. No leakage was observed even when pneumatic pressure of 4 kg/cm$^2$ or higher was applied.

What is claimed is:

1. A process for producing a hollow structure of carbon materials comprising the steps of:

mixing at least one member selected from the group consisting of a monomer and a precondensated polymer of a thermosetting resin with carbon powder to produce a mixture, kneading the mixture in a kneader capable of applying a high shearing force to produce a molding paste composition having carbon powder uniformly dispersed therein;

molding the molding paste composition into at least two portions of a hollow structure by a method selected from the group consisting of an injection molding method, an extrusion molding method, a casting method and a fluidizing method, bonding the two portions of a hollow structure together with a bonding paste composition to produce a bonded hollow structure, precarbonizing the bonded hollow structure to produce a hollow structure, and calcining the hollow structure in an inert gas atmosphere.

2. The process according to claim 1, wherein said thermosetting resin comprises at least one resin selected from the group consisting of furan resins, xylene resins, polyimide resins, bismaleimido resins and phenolic resins.

3. The process according to claim 1, wherein said carbon powder comprises at least one member selected from the group consisting of natural graphite, artificial graphite, carbon black, and carbon fiber chips.

4. The process of claim 2, wherein said thermosetting resin is a furan resin selected from the group consisting of furfural alcohol/furfural condensates, furfural/phenols, and furfural/ureas.

5. The process of claim 2 wherein said thermosetting resin is a phenolic resin selected from the group consisting of resols and novolaks.

6. The process of claim 1, wherein the molding paste composition and the bonding paste composition have the same chemical composition.

7. The process of claim 1, wherein the chemical composition of the mixing paste commposition is different from the chemical composition of the bonding paste composition.

8. The process of claim 1, wherein said bonding paste composition comprises phenol resin, graphite powder, and a curing agent.

* * * * *